United States Patent
Levijoki et al.

(10) Patent No.: US 9,133,750 B2
(45) Date of Patent: Sep. 15, 2015

(54) METHOD AND SYSTEM FOR VERIFYING THE OPERATION OF AN SCR CATALYST

(75) Inventors: Stephen Paul Levijoki, Swartz Creek, MI (US); Cheryl J Stark, Canton, MI (US); Scott R Gordon, Ann Arbor, MI (US); Yue-Yun Wang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 744 days.

(21) Appl. No.: 12/683,740

(22) Filed: Jan. 7, 2010

(65) Prior Publication Data

US 2011/0023456 A1 Feb. 3, 2011

Related U.S. Application Data

(60) Provisional application No. 61/229,941, filed on Jul. 30, 2009.

(51) Int. Cl.
*F01N 3/00* (2006.01)
*F01N 3/20* (2006.01)

(52) U.S. Cl.
CPC ............ *F01N 3/208* (2013.01); *F01N 2560/026* (2013.01); *F01N 2610/02* (2013.01); *F01N 2900/1614* (2013.01); *Y02T 10/24* (2013.01)

(58) Field of Classification Search
CPC .............. F01N 3/208; F01N 2560/026; F01N 2610/02; F01N 2900/1614; Y20T 10/24
USPC ............................................ 60/274, 277, 299
See application file for complete search history.

(56) References Cited

U.S. PATENT DOCUMENTS

| | | | | |
|---|---|---|---|---|
| 7,093,427 | B2 * | 8/2006 | van Nieuwstadt et al. | 60/286 |
| 2008/0010974 | A1 * | 1/2008 | Frazier et al. | 60/277 |
| 2008/0178575 | A1 * | 7/2008 | Shaikh et al. | 60/274 |
| 2008/0250778 | A1 * | 10/2008 | Solbrig | 60/301 |
| 2011/0203259 | A1 * | 8/2011 | Upadhyay et al. | 60/274 |

FOREIGN PATENT DOCUMENTS

CN 101285412 10/2008

* cited by examiner

*Primary Examiner* — Thomas Denion
*Assistant Examiner* — Matthew T Largi

(57) ABSTRACT

A method and control system for a selective catalytic reduction (SCR) catalytic converter and an ammonia dosing module that stores ammonia in a selective catalyst reducing (SCR) catalyst and that depletes the ammonia level by discontinuing or reducing dosing. The control system also includes an SCR conversion efficiency module that determines an SCR efficiency. An SCR efficiency comparison module compares the SCR efficiency to an efficiency threshold and generates a fault indicator when the SCR efficiency is not above the efficiency threshold.

20 Claims, 6 Drawing Sheets

METHOD AND SYSTEM FOR VERIFYING THE OPERATION OF AN SCR CATALYST

CROSS-REFERENCE TO RELATED APPLICATIONS

This application claims the benefit of U.S. provisional application Ser. No. 61/229,941, filed on Jul. 30, 2009. The disclosure of the above application is incorporated herein by reference in its entirety.

FIELD

The present disclosure relates to vehicle exhaust systems and, more particularly, to verifying the operation of a selective catalytic reduction (SCR) catalytic converter.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Diesel engine operation involves combustion that generates exhaust gas. During combustion, an air/fuel mixture is delivered through an intake valve to cylinders and is combusted therein. After combustion, the piston forces the exhaust gas in the cylinders into an exhaust system. The exhaust gas may contain emissions such as oxides of nitrogen ($NO_x$) and carbon monoxide (CO).

More and more exhaust hardware technology is being added to meet emissions on diesel applications. After treatment of exhaust gases includes the installation of multiple bricks, mixers and injectors for the exhaust stream. Regulations for oxides of nitrogen are increasing. The performance of the selective catalytic reduction catalytic converter must be monitored to meet the requirements.

SUMMARY

Accordingly, the present disclosure provides for a system and method for monitoring the efficiency of a selected catalytic reduction catalytic converter so that regulatory requirements may be met.

In one aspect of the disclosure, a control module for a selective catalytic reduction catalytic converter (SCR) includes an ammonia dosing module that stores ammonia in an SCR and that depletes the ammonia level by discontinuing or reducing dosing. The control system also includes an SCR conversion efficiency module that determines an SCR efficiency. An SCR efficiency comparison module compares the SCR efficiency to an efficiency threshold and generates a fault indicator when the SCR efficiency is not above the efficiency threshold.

In another aspect of the disclosure, a method includes storing ammonia in a selective catalyst reducing (SCR) catalyst, depleting or reducing the ammonia level, determining an SCR efficiency, comparing the SCR efficiency to an efficiency threshold and, generating a fault indicator in response to comparing.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

Figure 1:
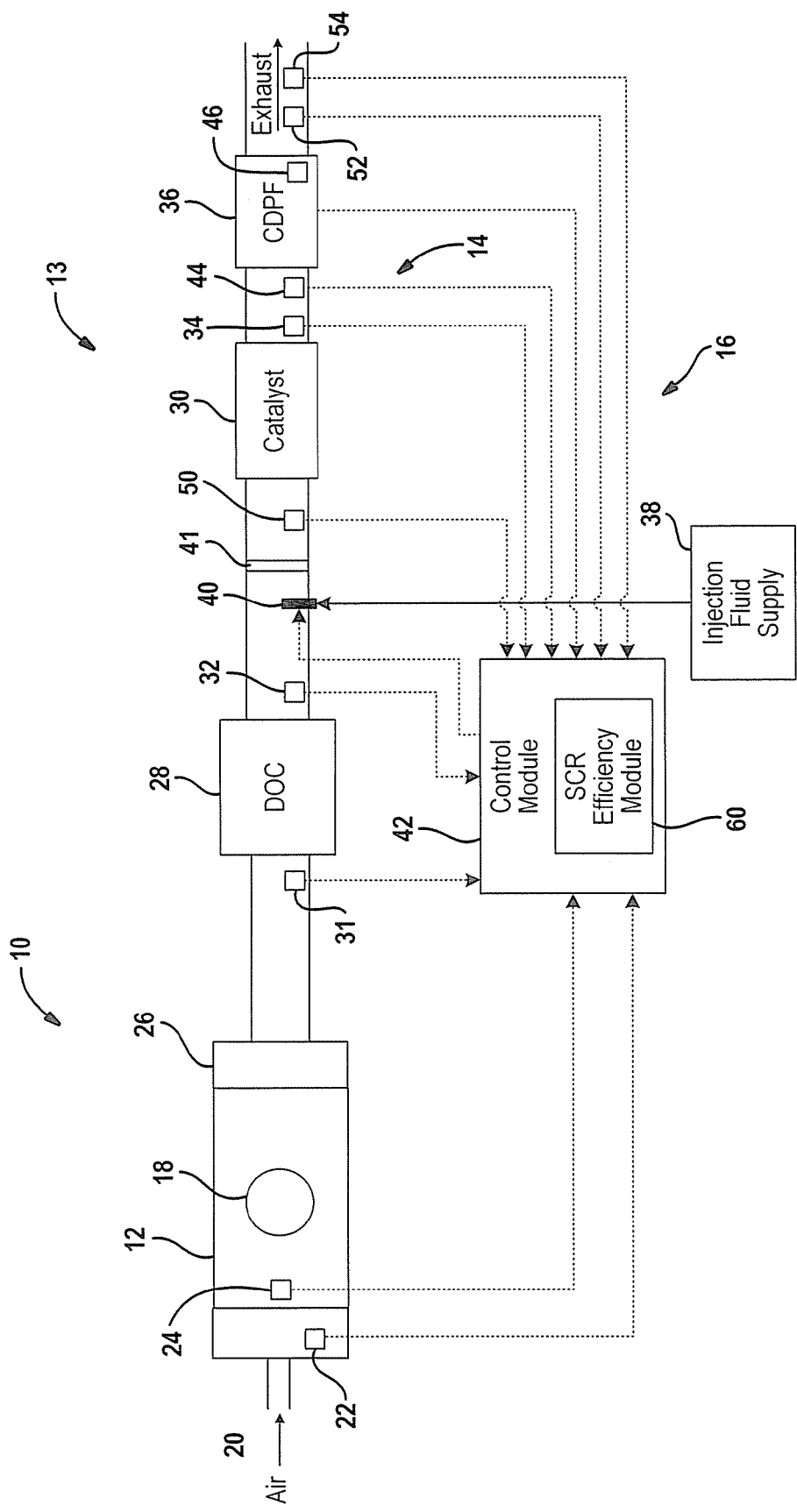
FIG. 1 is a functional block diagram of an engine system including an exhaust treatment system with temperature sensors integrated within a catalyst according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable hardware components that provide the described functionality.

While the following disclosure is set forth for diesel engines, other types of engines such as gasoline engines, including direct injection engines, may benefit from the teachings herein.

Diagnostic systems and methods according to the present disclosure use intrusive exhaust gas temperature management in order to provide a window for a selective catalyst reduction (SCR) efficiency module to run and evaluate the SCR efficiency on a vehicle that has a very low exhaust temperature profile under normal driving. Some vehicles do not have adequate SCR temperatures for a long enough period to perform SCR efficiency monitoring during normal driving.

The SCR efficiency module is required to run periodically. For example, the SCR efficiency module may be required to run once per trip. According to the present disclosure, the exhaust gas temperature is controlled in order to yield acceptable conditions for the SCR efficiency module to run. More particularly, the SCR efficiency module increases the temperature of the exhaust prior to estimating the efficiency. After the SCR efficiency module finishes estimating SCR efficiency, the SCR efficiency module returns to normal control and does not perform exhaust gas temperature management.

Referring now to FIG. 1, a diesel engine system 10 is schematically illustrated. The diesel engine system 10 includes a diesel engine 12 and an exhaust treatment system 13. The exhaust treatment system 13 further includes an exhaust system 14 and a dosing system 16. The diesel engine 12 includes a cylinder 18, an intake manifold 20, a mass air flow (MAF) sensor 22 and an engine speed sensor 24. Air flows into the engine 12 through the intake manifold 20 and is monitored by the MAF sensor 22. The air is directed into the cylinder 18 and is combusted with fuel to drive pistons (not shown). Although a single cylinder 18 is illustrated, it can be appreciated that the diesel engine 12 may include additional cylinders 18. For example, diesel engines having 2, 3, 4, 5, 6, 8, 10, 12 and 16 cylinders are anticipated.

Exhaust gas is produced inside the cylinder 18 as a result of the combustion process. The exhaust system 14 treats the exhaust gas before releasing the exhaust gas to the atmosphere. The exhaust system 14 includes an exhaust manifold 26 and a diesel oxidation catalyst (DOC) 28. The exhaust manifold 26 directs exhaust exiting the cylinder towards the DOC 28. The exhaust is treated within the DOC 28 to reduce the emissions. The exhaust system 14 further includes a catalyst 30, preferably a selective catalyst reducing (SCR) catalyst, a temperature sensor 31, an inlet temperature sensor 32, an outlet temperature sensor 34 and catalyzed diesel particulate filter (CDPF) 36. The DOC 28 reacts with the exhaust gas prior to treating the exhaust to reduce emission levels of the exhaust. The catalyst 30 reacts subsequent to treating the exhaust to further reduce emissions.

The temperature sensor 31 may be positioned between the engine and the DOC 18. The inlet temperature sensor 32 is located prior to the catalyst 30 to monitor the temperature change at the inlet of the catalyst 30, as discussed further below. The outlet temperature sensor 34 is located after the SCR catalyst to monitor the temperature change at the outlet of the catalyst 30. Although the exhaust treatment system 13 is illustrated as including the inlet and outlet temperature sensors 32, 34 as being outside the catalyst 30, the inlet and outlet temperature sensors 32, 34 can be located internally with the catalyst to monitor the temperature change of the exhaust at the inlet and outlet of the catalyst. The CDPF 36 further reduces emissions by trapping diesel particulates (i.e., soot) within the exhaust.

The dosing system 16 includes an injection fluid supply 38 that may be used for injecting urea from a tank and a dosing injector 40. The dosing system 16 injects injection fluid such as urea into the exhaust. The urea mixes with the exhaust and further reduces the emissions when the exhaust/urea mixture is exposed to the catalyst 30. A mixer 41 is used to mix the injection fluid such as urea with the exhaust gasses prior to the exhaust gases entering the catalyst.

A control module 42 regulates and controls the operation of the engine system 10 and controls and monitors operation of the dosing system 16.

An exhaust gas flow rate sensor 44 may generate a signal corresponding to the flow of exhaust in the exhaust system. Although the sensor is illustrated between the catalyst 30 and the CDPF 36 various locations within the exhaust system may be used for measurement including after the exhaust manifold and before the catalyst 30.

A temperature sensor 46 generates a particulate filter temperature sensor signal that corresponds to a measured particulate filter temperature. The temperature sensor 46 may be disposed on or within the diesel particulate filter 36. The temperature sensor 46 may also be located just after or just before the diesel particulate filter relative to the exhaust stream. The temperature sensor 46 communicates a measured particulate filter temperature signal to the control module 42.

Other sensors in the exhaust system may include a NOx sensor 50 which generates a signal corresponding to the amount of oxides of nitrogen in the exhaust system. This may be referred to NOx-In since this sensor is upstream of the catalyst. A NOx-Out sensor 52 may be positioned downstream such as after the diesel particulate filter for generating a signal corresponding to the oxides of nitrogen leaving the diesel particulate filter. The upstream and downstream NOx may also be located in the SCR. In addition, an ammonia ($NH_3$) sensor 54 generates a signal corresponding to the amount of ammonia within the exhaust stream. The ammonia sensor 54 is optional, but can be used to simplify the control system due to the ability to discern between NOx and $NH_3$.

The control module 42 may include an SCR efficiency module 60 that is used to determine the efficiency of the conversion of NOx at the SCR. Further details of the control module 42 and the SCR efficiency module 60 is provided below.

Figure 2:
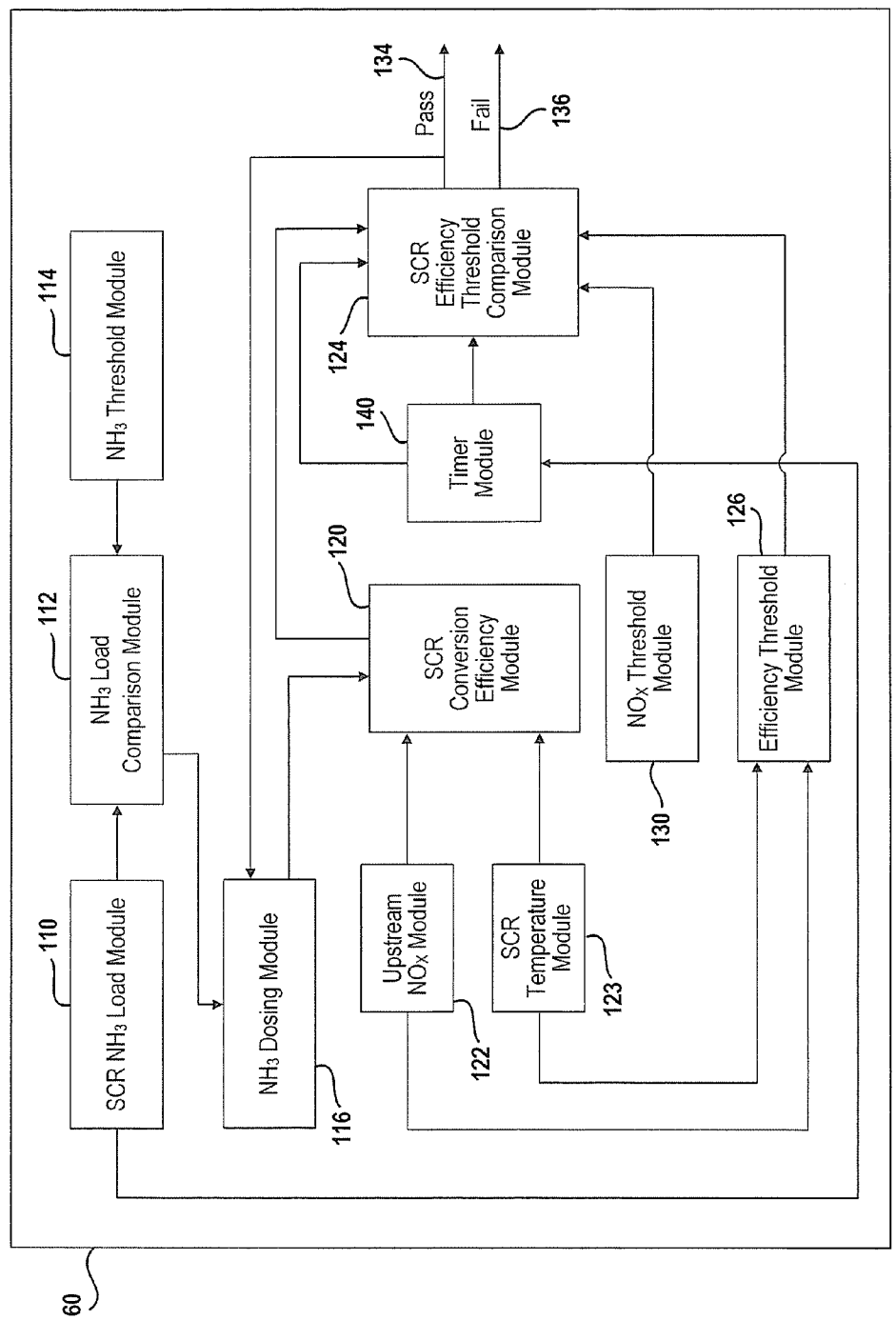
FIG. 2 is a functional block diagram of the SCR control module of FIG. 2.

Referring now to FIG. 2, the SCR efficiency module 60 of FIG. 1 is illustrated in further detail. The module 60 receives inputs from the various sensors including the oxides of nitrogen sensors 50, 52, the temperature sensors 31, 32 and 34, and the ammonia sensor 54.

The SCR efficiency module 60 may include an SCR ammonia ($NH_3$) load module 110. The SCR ammonia load module is used for determining an SCR ammonia load. The ammonia load is provided to an ammonia load comparison module 112. The ammonia load comparison module compares the amount of ammonia to a threshold. The threshold may be provided by an ammonia threshold module 114. When the amount of ammonia stored within the SCR is above a threshold for the depletion or reduced ammonia load test, the ammonia load comparison module 112 provides a signal to the ammonia dosing module 116. The ammonia dosing module 116 disables or modifies the dosing system and initiates the depletion or reduced dosing testing. An SCR conversion efficiency module 120 receives the dosing system signal and determines the SCR efficiency. The SCR conversion efficiency module 120 may receive an amount or mass of upstream oxides of nitrogen signal from the upstream NOx module 122. The SCR conversion efficiency module 120 may also receive an SCR temperature signal that generates a signal corresponding to the SCR temperature. The SCR temperature module 123 may provide the instantaneous temperature or an average SCR temperature.

The SCR conversion efficiency module 120 determines the conversion efficiency as a function of the upstream and downstream NOx cumulated masses since the depletion or reduced dosing has been started. The SCR conversion efficiency module 120 generates an SCR conversion efficiency signal and communicates the SCR conversion efficiency signal to the SCR efficiency threshold comparison module 124. The SCR efficiency threshold comparison module 124 receives an efficiency threshold that is determined using the upstream NOx and SCR temperature. The efficiency threshold module 126 generates an efficiency threshold signal and communicates the efficiency threshold signal to the SCR efficiency threshold comparison module 124. The efficiency threshold may be based on an SCR performance model and an SCR temperature.

The SCR efficiency threshold comparison module 124 may also be in communication with a NOx threshold module 130. The NOx threshold module provides an upstream NOx threshold. The SCR efficiency threshold comparison module may generate a pass indicator 134 or a fail indicator 136 based upon the SCR conversion efficiency signal, the efficiency threshold signal and the NOx threshold signal. For example, when the SCR efficiency is above the efficiency threshold after an amount of upstream NOx has been generated as compared to the $NH_3$ load on the SCR, the pass indicator 134 is generated. When the SCR efficiency is not above the calibrated efficiency threshold after the amount of upstream NOx, a fail indicator 136 may be generated.

The pass indicator 134 and the fail indicator 136 may be a pass flag or fail flag and may be used to generate fault codes in an on-board diagnostic system. The pass indicator 134 and fail indicator 136 may also communicate with warning lights or warning buzzers.

A timer module 140 may be used to time the process. That is, the timer module 140 may provide an input to the SCR efficiency threshold comparison module 124 that will abort the intrusive test after a pre-determined amount of time. The pre-determined amount of time may correspond to the amount of time that would allow a faulty SCR to be determined. The accumulated upstream NOx mass is the basis for the test. The timer may have some use, but it is not the primary means to determine when a faulty SCR would be determined. Hence, it will be based on the drive cycle and not just time.

Figure 3A:
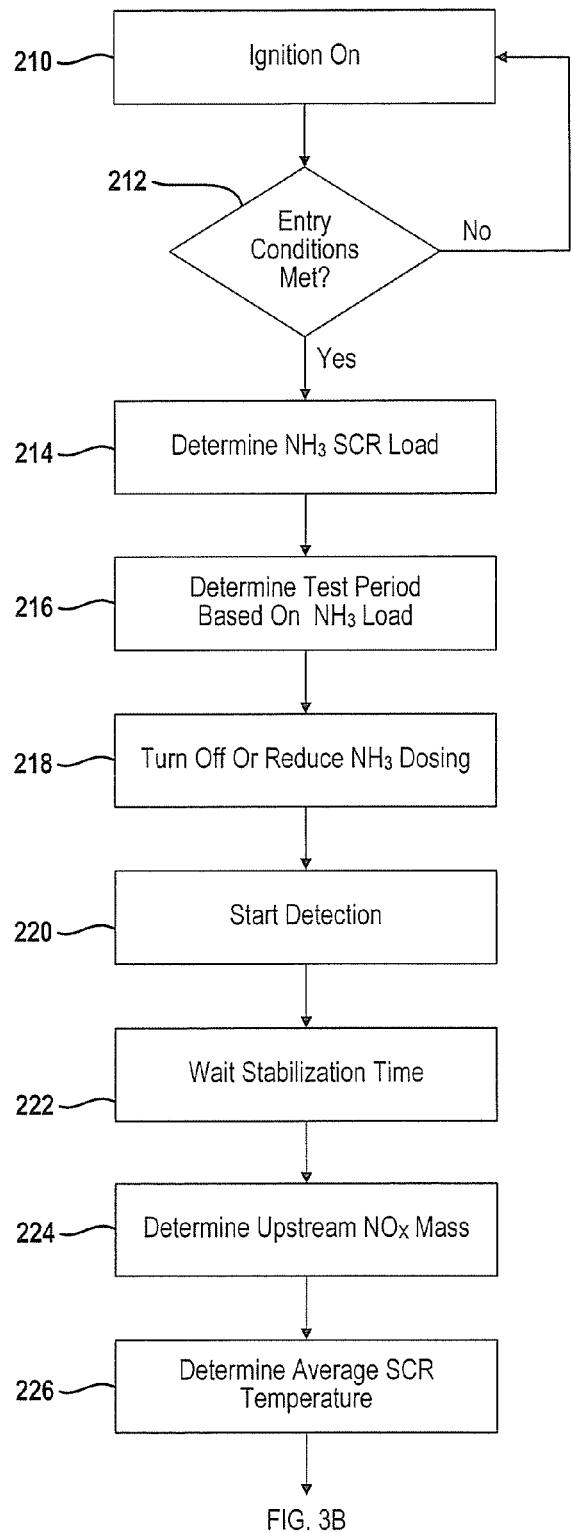
FIGS. 3A and 3B are a continuous flowchart of a method for controlling the system.
Figure 3B:
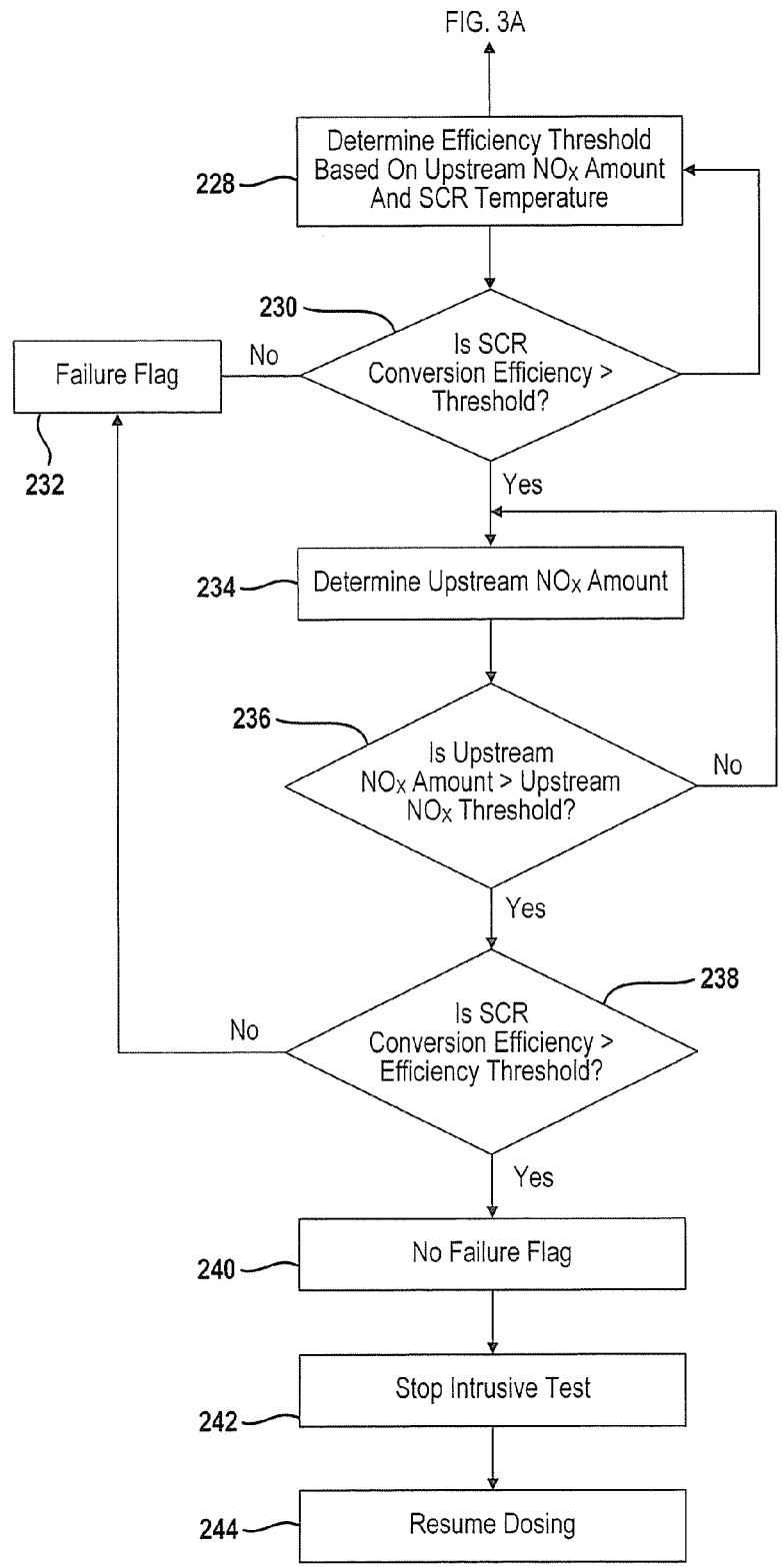

Referring now to FIGS. 3A and 3B, a method for determining the SCR catalyst efficiency is set forth. In step 210, the method starts when the ignition is on.

In step 212, it is determined whether entry conditions for the method have been met. Various entry conditions may be required to be met prior to entering the method for determining the efficiency of an SCR catalyst. The entry conditions may include the ambient temperature, the altitude, the reductant tank level, or other conditions. Some or all of the conditions may be used alone or in combination for the entry conditions.

In step 214, the amount of ammonia (NH$_3$) that is loaded into the SCR is determined. The amount of ammonia may be determined by measuring the mass. In step 216, a test period based upon the amount of ammonia determined in step 214 may be determined. As will be described below, the test period may correspond to the amount of upstream NOx accumulated versus the estimated amount of ammonia to determine a failed SCR.

In step 218, the ammonia dosing system is turned off or reduced. In step 220, the depletion of the ammonia from the SCR takes place. The depletion of the ammonia stored within the SCR takes place in combination with the oxides of nitrogen produced by the engine. The oxides of nitrogen will consume the ammonia stored within the SCR. In step 222, a delay time period may be waited after the start of depletion for the system to stabilize.

In step 224, the upstream oxide of nitrogen mass may be determined. The amount of upstream oxides of nitrogen may be sensed by the NOx sensor 50 illustrated in FIG. 1. In step 226, an average SCR temperature may also be determined. The average SCR temperature may be determined using a sensor 34 within or next to the SCR as illustrated in FIG. 1.

In step 228, the efficiency threshold based upon the upstream NOx amount and an SCR temperature is determined. In step 230, if the SCR conversion efficiency is not greater than an efficiency threshold, a failure indicator or flag may be generated in step 232. In step 230, if the SCR conversion efficiency is greater than an efficiency threshold, step 234 determines the upstream NOx amount. The upstream NOx amount may correspond to an amount of NOx that is required to pass through the system before the system will exit the method. The upstream NOx amount may also correspond to a time period corresponding to an amount of time that allows an amount of NOx to pass through the system. Both the time period and the upstream NOx amount are based upon the amount of NOx from the SCR load determined in step 214.

In step 236, if the upstream NOx amount is not greater than the upstream NOx threshold, step 234 is again performed. When the upstream NOx amount is greater than the upstream NOx threshold, step 238 may be performed. In step 238, the SCR conversion efficiency is compared with the efficiency threshold. If the SCR conversion efficiency is not greater than the conversion threshold, the failure flag in step 232 may be set. In step 238, if the SCR conversion efficiency is greater than the efficiency threshold, step 240 may generate a no failure flag or a pass flag. Other types of indicators may also be generated in step 242 to indicate the SCR efficiency is above a predetermined level. In step 242, the intrusive test is ended. In step 244, dosing is resumed using the dosing system.

Figure 4A:
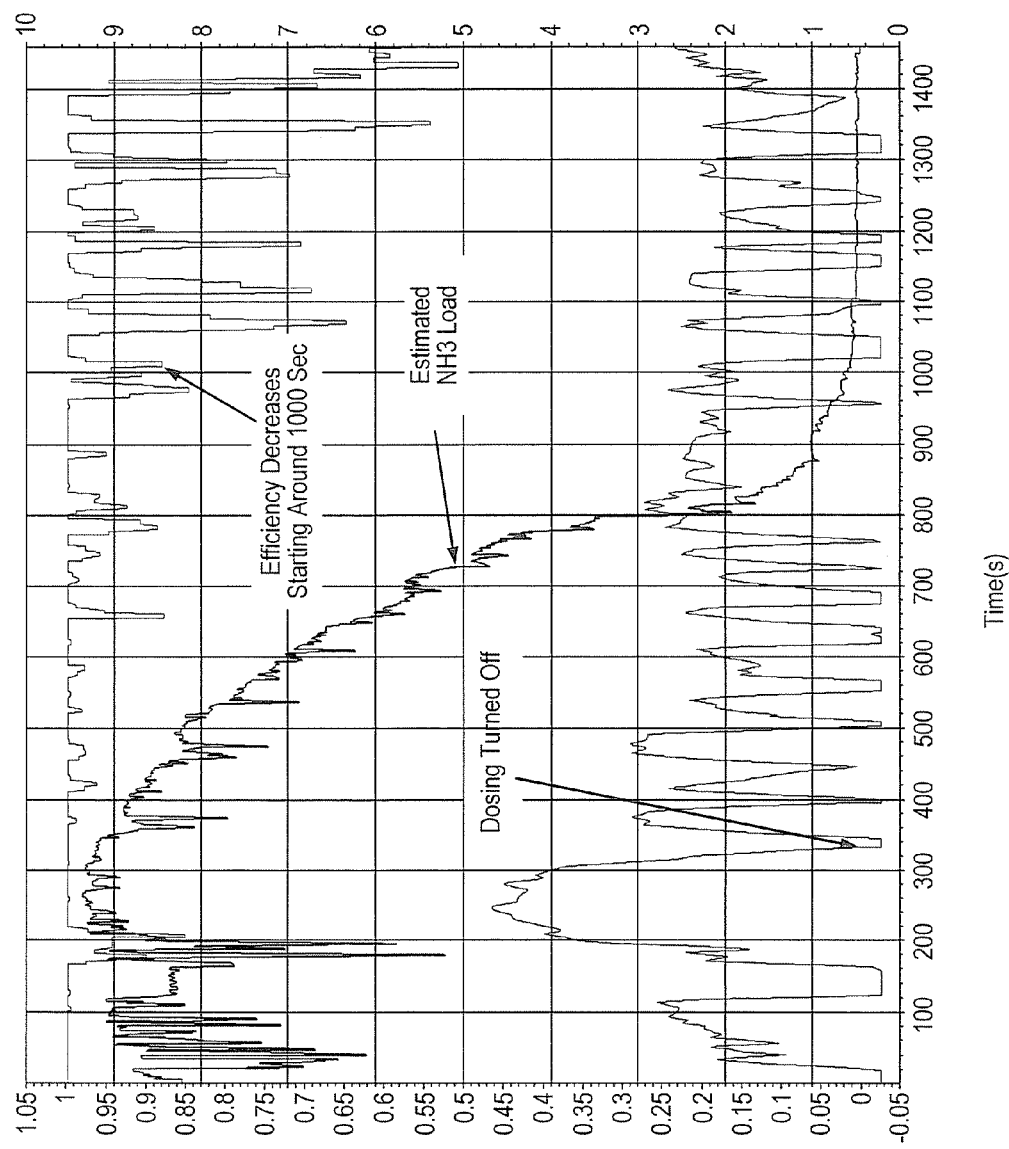
FIGS. 4A and 4B are plots of a good SCR (4A) and a bad SCR (4B) efficiency for vehicles operated in a similar manner.
Figure 4B:
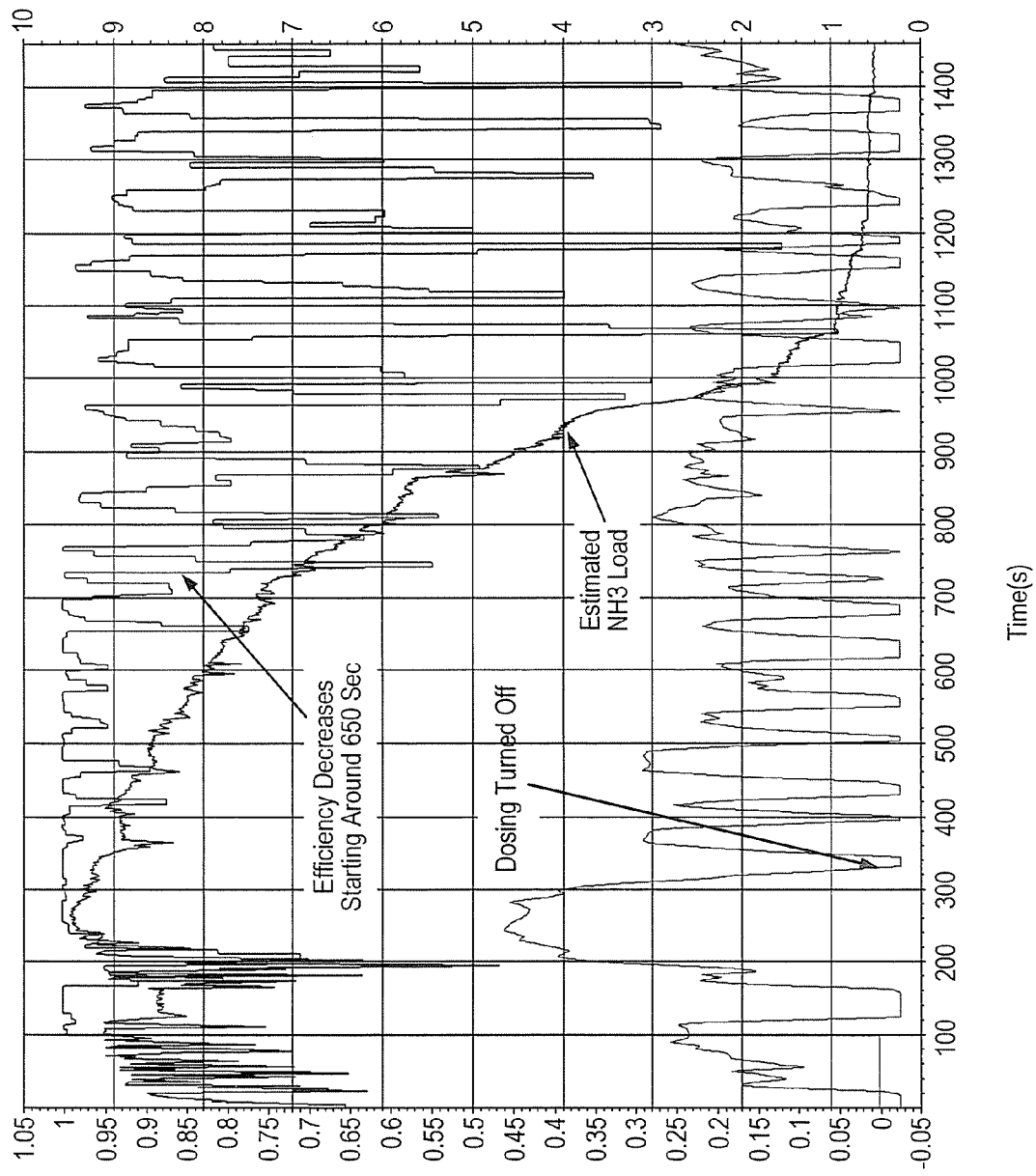

Referring now to FIG. 4A, a plot of an SCR efficiency with a good SCR is illustrated. FIG. 4B illustrates a plot of bad SCR efficiency. Each of the plots lines illustrates a common time for dosing being turned off or reduced based on the desired ammonia load to start the intrusive test. As can be seen, the good SCR efficiency SCR maintains nearly a one-hundred percent efficiency across the top of the plot up to about 1000 seconds. The bad SCR efficiency decreases earlier at about 650 seconds because the amount of ammonia required to be stored cannot be stored in a degraded SCR. The estimated NH$_3$ load for each plot is also illustrated.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method comprising:
    injecting ammonia, using a dosing injector, into an exhaust stream to store ammonia in a selective catalyst reducing (SCR) catalyst;
    determining whether the stored ammonia is greater than an ammonia threshold;
    reducing an ammonia dosing amount of the SCR catalyst if the stored ammonia is greater than an ammonia threshold;
    waiting a delay period;
    determining, after the delay period, an SCR efficiency if the ammonia dosing amount is reduced;
    determining an efficiency threshold;
    comparing, in response to the ammonia dosing amount being reduced, the SCR efficiency to the efficiency threshold; and
    when the SCR efficiency is not above the efficiency threshold, generating a fault indicator in response to the comparing, wherein the efficiency threshold is based on an SCR performance model.

2. The method as recited in claim 1 wherein reducing the ammonia dosing amount comprises changing operation of the dosing system.

3. The method as recited in claim 1 wherein determining an SCR efficiency comprises determining the SCR efficiency based on an amount of upstream oxides of nitrogen.

4. The method as recited in claim 1 further comprising prior to comparing the SCR efficiency to an efficiency threshold, determining the efficiency threshold based on an SCR temperature.

5. The method as recited in claim 1 wherein determining an efficiency threshold comprises prior to comparing the SCR efficiency to the efficiency threshold, determining the efficiency threshold based on an SCR temperature and an upstream amount of oxides of nitrogen.

6. The method as recited in claim 1 wherein generating a fault indicator comprises when the SCR efficiency is not above the efficiency threshold after a predetermined amount of oxides of nitrogen, generating the fault indicator.

7. The method as recited in claim 1 wherein comparing the SCR efficiency to an efficiency threshold comprises comparing the SCR efficiency to the efficiency threshold until a predetermined amount of oxides of nitrogen are generated after reducing the ammonia dosing amount.

8. The method as recited in claim 1 wherein generating a fault indicator comprises generating a fault flag.

9. The method as recited in claim 1 further comprising when the SCR efficiency is above the efficiency threshold, generating a non-fault indicator.

10. The method as recited in claim 1 further comprising when the SCR efficiency is above or below the efficiency threshold, enabling a dosing system.

11. The method as recited in claim 1 further comprising when the SCR efficiency is above the efficiency threshold and after a predetermined amount of oxides of nitrogen are generated, generating a non-fault indicator.

12. A control system comprising:
a dosing injector configured to inject ammonia into an exhaust stream;
a first electronic circuit configured to:
control the dosing injector to store ammonia in a selective catalyst reducing (SCR) catalyst;
determine whether the stored ammonia is greater than an ammonia threshold; and
control reducing of an ammonia dosing amount if the first electronic circuit determines the stored ammonia is greater than the ammonia threshold;
a second electronic circuit configured to wait a delay period and determine, after the delay period, an SCR efficiency if the ammonia dosing amount is reduced; and
a third electronic circuit configured to:
determine an efficiency threshold;
perform a comparison, in response to the ammonia dosing amount being reduced, of the SCR efficiency to the efficiency threshold; and
generate a fault indicator in response to the comparison;
wherein the efficiency threshold is based on an SCR performance model.

13. The control system as recited in claim 12 wherein the SCR efficiency is based on an upstream oxide of nitrogen amount.

14. The control system as recited in claim 12 wherein prior to comparing the SCR efficiency to an efficiency threshold, determining an efficiency threshold, based on an SCR temperature and an SCR performance model.

15. The control system as recited in claim 12 wherein the efficiency threshold is based on an SCR temperature.

16. The control system as recited in claim 12 wherein the third electronic circuit generates the fault indicator when the SCR efficiency is not above the efficiency threshold after a predetermined amount of oxides of nitrogen.

17. The control system as recited in claim 12 wherein the third electronic circuit compares the SCR efficiency to the efficiency threshold until a predetermined amount of oxides of nitrogen are generated after reducing the ammonia dosing amount.

18. The control system as recited in claim 12 wherein the fault indicator comprises a fault flag.

19. The control system as recited in claim 12 wherein the third electronic circuit is further configured to enable a dosing system when the SCR efficiency is above or below the efficiency threshold.

20. The control system as recited in claim 12 wherein the third electronic circuit is further configured to generate a non-fault indicator when the SCR efficiency is above the efficiency threshold until a predetermined amount of oxides of nitrogen are measured.

* * * * *